United States Patent
Bengtsson et al.

(10) Patent No.: US 9,425,879 B2
(45) Date of Patent: Aug. 23, 2016

(54) MOBILE COMMUNICATIONS USING BASE STATION CONTROLLED OPTIMIZATION OF ADAPTIVE ANTENNA SELECTION PARAMETERS, TERMINALS WITH ADAPTIVE ANTENNA SYSTEM, AND METHOD

(71) Applicant: Sony Corporation, Tokyo (JP)

(72) Inventors: Erik Bengtsson, Lund (SE); Thomas Bolin, Lund (SE); Peter Karlsson, Lund (SE); Rickard Ljung, Helsingborg (SE); Zhinong Ying, Lund (SE)

(73) Assignee: Sony Corporation, Tokyo (JP)

( * ) Notice: Subject to any disclaimer, the term of this patent is extended or adjusted under 35 U.S.C. 154(b) by 6 days.

(21) Appl. No.: 14/353,508

(22) PCT Filed: Aug. 7, 2013

(86) PCT No.: PCT/IB2013/001738
§ 371 (c)(1),
(2) Date: Apr. 23, 2014

(87) PCT Pub. No.: WO2015/004494
PCT Pub. Date: Jan. 15, 2015

(65) Prior Publication Data
US 2015/0215019 A1    Jul. 30, 2015

Related U.S. Application Data

(60) Provisional application No. 61/844,942, filed on Jul. 11, 2013.

(51) Int. Cl.
*H04B 7/06*     (2006.01)
*H04B 7/04*     (2006.01)

(52) U.S. Cl.
CPC ............ *H04B 7/061* (2013.01); *H04B 7/0404* (2013.01); *H04B 7/063* (2013.01); *H04B 7/0691* (2013.01)

(58) Field of Classification Search
CPC  H04B 7/0404; H04B 7/0608; H04B 7/0693; H04W 52/0212; H04W 52/0277; H04W 52/367; H04W 52/42; Y02B 60/50
See application file for complete search history.

(56) References Cited

U.S. PATENT DOCUMENTS

| | | |
|---|---|---|
| 8,472,381 B1 | 6/2013 | Lee et al. |
| 2011/0018780 A1 | 1/2011 | Tassoudji |
| 2013/0051261 A1* | 2/2013 | Kazmi et al. ............... 370/252 |

FOREIGN PATENT DOCUMENTS

WO    2012/177218 A2    12/2012

OTHER PUBLICATIONS

International Search Report and Written Opinion, corresponding to PCT/IB2013/001738, mailed Mar. 6, 2014.

*Primary Examiner* — Lewis West
(74) *Attorney, Agent, or Firm* — Renner, Otto, Boiselle and Sklar LLP

(57) ABSTRACT

A mobile communications terminal with plural antennas for uplink communications with a network base station in a cell, uses an adaptive antenna selection algorithm to select antennas. A method of operating a mobile communications terminal. The cell operator or base station provides parameters and/or settings to the terminal to determine algorithm behavior in selecting antennas, for example, according to operative characteristics of signals in uplink communications in the network, operation of the terminal, and/or network conditions. A communications method includes sending from a base station one or more parameters and/or settings for a terminal to select which of plural antennas of the terminal to use transmitting signals to the base station. A base station transmits to terminals one or more such parameters and/or settings for use in the adaptive antenna selection algorithm to select antennas for transmitting signals to the base station.

20 Claims, 6 Drawing Sheets

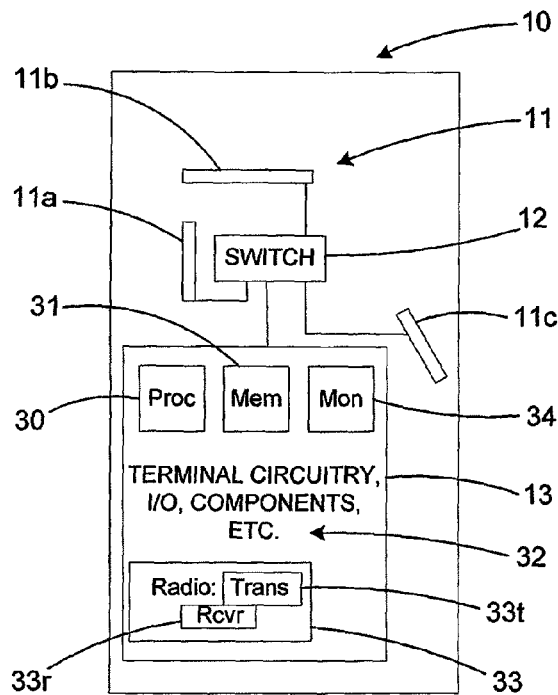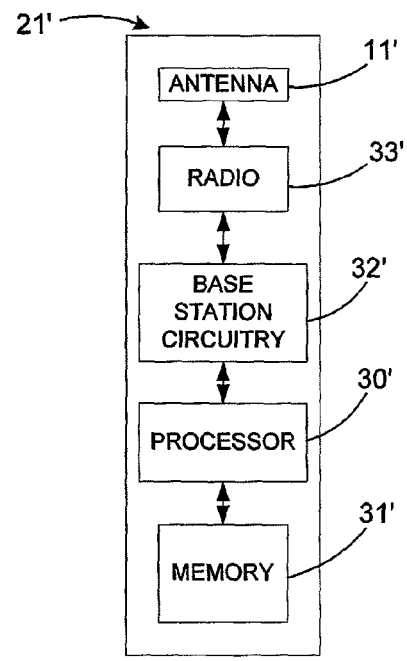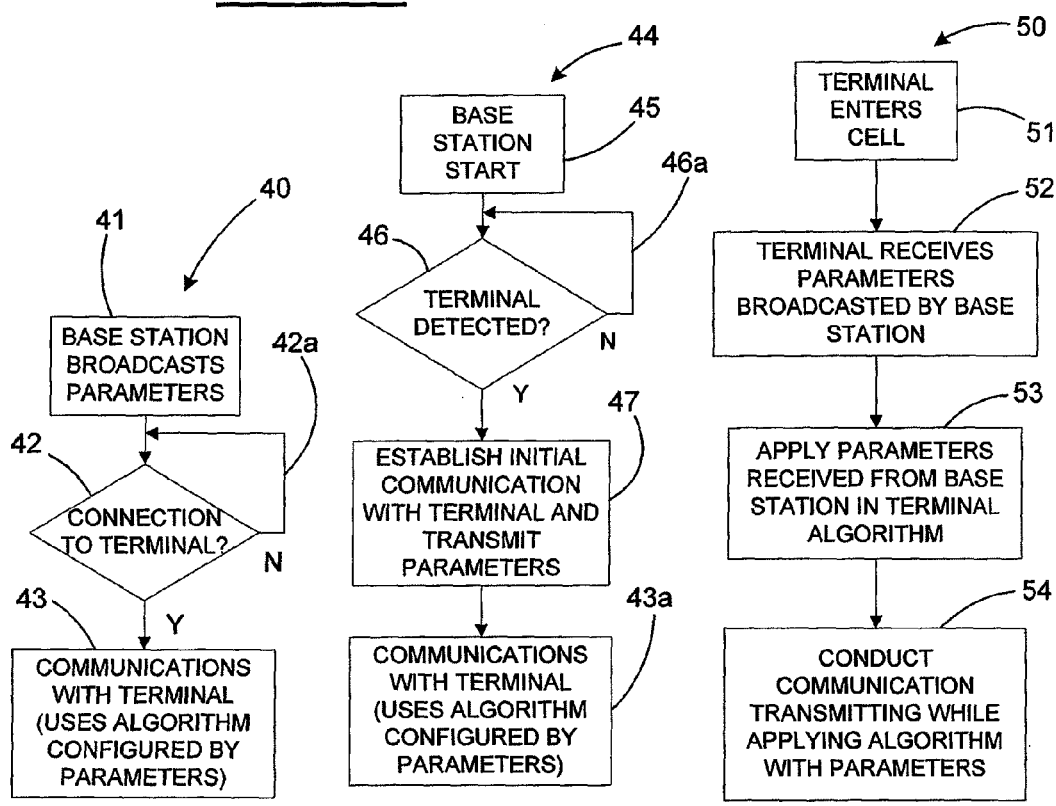

MOBILE COMMUNICATIONS USING BASE STATION CONTROLLED OPTIMIZATION OF ADAPTIVE ANTENNA SELECTION PARAMETERS, TERMINALS WITH ADAPTIVE ANTENNA SYSTEM, AND METHOD

CROSS-REFERENCE TO RELATED APPLICATION AND PRIORITY CLAIM

This application claims priority from U.S. Provisional patent application No. 61/844,942, filed Jul. 11, 2013, the entire disclosure of which hereby is incorporated by reference.

TECHNICAL FIELD

The present invention relates generally to use of multiple antennas for uplink communications transmission, and, more particularly, to mobile communications using base station controlled optimization of adaptive antenna selection parameters, terminals with adaptive antenna system, and method.

BACKGROUND

Mobile and/or wireless electronic devices are becoming increasingly popular. For example, mobile telephones, smart phones, tablet computers, portable media players and portable gaming devices are now in wide-spread use. In addition, the features and accessories associated with certain types of electronic devices have become increasingly diverse. To name a few examples, many portable electronic devices, such as mobile phones, have cameras, text messaging capability, Internet browsing capability, electronic mail capability, video playback capability, audio playback capability, image display capability and handsfree headset interfaces.

In a wireless or mobile communications system (collectively sometimes referred to below as mobile communications system) a network having a base station (sometimes referred to below as a network base station) may be in communications with one or more terminals. The base station typically is at a fixed location and the terminal(s) typically are portable and movable to and within a cell that is defined by the communications area covered by the base station. Downlink, downlink communications and downlink transmission, for example, refer to transmission from a base station to a terminal; and uplink, uplink communications and uplink transmission, for example, refer to transmission from a terminal to a base station.

A terminal used in a mobile communications system can be equipped with more antennas than transmission chains. One example is a terminal having two antennas due to utilizing downlink receive diversity, e.g., downlink 2×2 MIMO (multiple input multiple output), while the uplink only uses one transmission chain. This enables a selection possibility within the terminal what antenna(s) to utilize for the downlink transmission chain(s). If the terminal can dynamically switch what antenna(s) to utilize from the downlink transmission chain(s) for a given time, this can be denoted as adaptive antenna selection. Use of a 2×2 MIMO downlink, for example, can increase system throughput from a base station to a terminal.

SUMMARY

Using adaptive antenna selection while employing parameters, which are provided from an operator or network, in an antenna switching algorithm, provides for efficient and good quality uplink communications from a mobile phone or other portable or mobile wireless device that has multiple antennas.

Adaptive antenna selection (also referred to as antenna switching or antenna swapping) can be used in a terminal for uplink communications transmission to avoid the effect on the transmission signal due to user loading, e.g., caused by an unfavorable hand position holding a terminal, or to mitigate fading dips. To do adaptive antenna selection, an algorithm would be defined to analyze the current radio environment for the terminal and to make decisions for switching between or among antennas for uplink. The algorithm may be referred to as the adaptive algorithm, adaptive antenna selection algorithm, selection algorithm, switching algorithm, or swapping algorithm, for example. Optimum setting for the adaptive algorithm to obtain a behavior of the algorithm to decide when to switch and/or to which antenna to switch, for example, to try to optimize uplink communications, may be different in different networks and it may be necessary to compromise on those settings in order to have a robust algorithm for any condition.

A problem may be encountered if terminals from different terminal vendors would implement proprietary adaptive antenna selection solutions without any control from network base stations, as the terminals would likely run very different switching algorithms. This would lead to inconsistent terminal behavior within the wireless networks. For example, switching decisions could be taken based on very different parameters and the frequency of switching could be very different one terminal from another.

According to an embodiment hereof, to achieve a consistent behavior between terminals it is beneficial if the network would decide how the adaptive antenna selection would be implemented within the terminals. This can be achieved by a standardized set of parameters and settings to be integrated into the specifications of the communications system protocols. The parameters and settings give a framework of how the adaptive algorithm should behave.

Briefly, an aspect of the invention relates to a network of a mobile communications system defining key parameters and/or settings in the adaptive antenna selection algorithm used by terminals in the network.

Another aspect of the invention relates to a method for a network base station to transmit a selection of parameters and/or settings to be used in terminals to define how an adaptive antenna selection algorithm should behave.

Another aspect relates to a network base station configured to transmit a selection of parameters and/or settings to be used in terminals to define behavior of an adaptive antenna selection algorithm.

Another aspect relates to a method for a terminal to respond to a selection of parameters and/or settings received from a network base station to define behavior of an adaptive antennal selection algorithm.

Another aspect relates to applying the above method and, accordingly, dynamically selecting respective antennas.

Another aspect relates to a terminal configured to respond to a selection of parameters and/or settings received from a network base station to define behavior of an adaptive antennal selection algorithm.

Another aspect relates to a terminal configured to respond to a selection of parameters and/or settings received from a network base station to define an adaptive antennal selection algorithm and configured, accordingly, to use the algorithm to select respective antennas.

An aspect of the invention relates to a mobile communications terminal, including a transmitter configured to provide signals for uplink transmission in a network, a plurality of antennas configured to cooperate with the transmitter to transmit signals for communications with a base station in the network, a non-transitory memory configured to store antenna selection instructions for use in selecting which of the antennas to cooperate with the transmitter to transmit signals, a processor configured to execute antenna selection instructions from the memory to determine selecting of respective antennas, and a receiver configured to receive from a base station signals representing one or more parameters and/or settings for use in antenna selection instructions executed by the processor in determining selecting of respective antennas.

According to another aspect, to the antenna selection instructions include an adaptive antenna selection algorithm, and the received parameters and/or settings determine behavior of the adaptive antenna selection algorithm in response to executing of the antenna selection instructions by the processor.

According to another aspect, the mobile communications terminal includes a monitor configured to monitor operative characteristics of the terminal, and wherein the processor is configured to execute antenna selection instructions relative to the monitored operative characteristics to determine selecting of respective antennas.

According to another aspect, the monitor is configured to monitor operative characteristics of signals in uplink communications in the network, operation of the terminal, and/or network conditions, and wherein the processor is configured to execute the antenna selection algorithm in relation to the monitored operative characteristics.

According to another aspect, the operative characteristics, operation of the terminal, and/or network conditions include at least one of:
(i) Maximum swapping rate for antennas;
(ii) Antenna tuning states for main and diversity antenna(s);
(iii) Bands where the antenna selection algorithm should or should not be active;
(iv) Threshold level for when the antenna selection algorithm should be active;
(v) Hysteresis for antenna selection;
(vi) Filtering of RSSI;
(vii) Proximity sensor induced power drop;
(viii) Diversity antenna power reduction (static); and/or
(ix) Force swapping delay time.

According to another aspect, the processor is configured to control the transmitter as to provide signals compatible with the currently selected antenna.

According to another aspect, the terminal is operable to transmit uplink signals in a number of transmission chains, and the number of the antennas is larger than the number of transmission chains.

According to another aspect, the mobile communications terminal includes a case, and wherein a number of the antennas are at different locations and/or orientations relative to the case.

According to another aspect, the mobile communications device includes switches configured to couple signals from the transmitter to respective antennas, and wherein the processor is configured to control the switches to couple respective antennas to receive signals for communications with a base station in the network.

According to another aspect, the transmitter, antennas and processor are configured for uplink communications in a plurality of respective bands and modes, and wherein the processor is configured to select respective antennas based at least in part on the band and/or mode of uplink communications.

According to another aspect, the receiver is configured to receive signals from a base station representing one or more parameters and/or settings in response to entering a network cell.

According to another aspect, the receiver is configured to receive signals from a base station in response to making a connection with the base station and then via a dedicated control channel.

According to another aspect, the mobile communications terminal is a mobile phone.

Another aspect relates to a mobile communications system, including at least one terminal as set forth above, and a base station for a mobile communications cell for communicating with one or more of the terminal(s) in the cell, including a base station transmitter configured to transmit to terminals in the cell one or more parameters and/or settings representative of characteristics of the base station, cell and/or respective terminals in the cell for use in selecting respective antennas in a terminal for transmitting signals to the base station.

Another aspect relates to a method of selecting respective antennas in a mobile communications terminal that has a plurality of antennas to transmit signals, including receiving from a remote source in a network signals representing one or more parameters and/or settings for use in determining respective antennas to transmit signals, processing an adaptive antenna selection algorithm associated with the mobile communications terminal using one or more of the parameters and/or settings to determine respective antennas to transmit signals, and using the results of the processing, selecting a respective antenna.

According to another aspect, the mobile communications terminal includes a processor for performing the processing step, and includes a transmitter for providing signals for transmitting via respective antennas, and the method further includes controlling the transmitter as to provide signals compatible with the currently selected antenna.

According to another aspect, the processing includes processing antenna selection instructions include an adaptive antenna selection algorithm, and the signals representing parameters and/or settings determine behavior of the adaptive antenna selection algorithm in response to executing of the antenna selection instructions during processing by the processor.

Another aspect relates to monitoring operative characteristics of the terminal, and wherein the processing further includes executing antenna selection instructions relative to the monitored operative characteristics to determine selecting of respective antennas.

According to another aspect, the monitoring includes monitoring operative characteristics of signals in uplink communications in the network, operation of the terminal, and/or network conditions, and wherein the executing includes executing the antenna selection algorithm in relation to the monitored operative characteristics.

According to another aspect, the operative characteristics, operation of the terminal, and/or network conditions include at least one of:
(i) Maximum swapping rate for antennas;
(ii) Antenna tuning states for main and diversity antenna(s);
(iii) Bands where the antenna selection algorithm should or should not be active;

(iv) Threshold level for when the antenna selection algorithm should be active;
(v) Hysteresis for antenna selection;
(vi) Filtering of RSSI;
(vii) Proximity sensor induced power drop;
(viii) Diversity antenna power reduction (static); and/or
(ix) Force swapping delay time.

According to another aspect, the terminal is configured to receive parameters and/or settings as broadcast from a network cell base station upon entering the network cell.

According to another aspect, the terminal is configured to establish communications with a base station and to receive parameters and/or settings via a dedicated control channel.

Another aspect relates to a communications method, including sending from a base station one or more parameters and/or settings for use by a terminal in a process to select which of a plurality of antennas in the terminal to use in transmitting signals from the terminal (to the base station).

According to another aspect, the sending includes sending one or more parameters and/or settings for use in an adaptive antenna selection algorithm in a terminal, wherein the parameters and/or settings are representative of operative characteristics of signals in uplink communications in the network, operation of the terminal, and/or network conditions, and wherein the operative characteristics, operation of the terminal, and/or network conditions include at least one of:
(i) Maximum swapping rate for antennas;
(ii) Antenna tuning states for main and diversity antenna(s);
(iii) Bands where the antenna selection algorithm should or should not be active;
(iv) Threshold level for when the antenna selection algorithm should be active;
(v) Hysteresis for antenna selection;
(vi) Filtering of RSSI;
(vii) Proximity sensor induced power drop;
(viii) Diversity antenna power reduction (static); and/or
(ix) Force swapping delay time.

According to another aspect, the base station is configured to broadcast in a network cell parameters and/or settings for receipt by a terminal upon the terminal entering the network cell.

According to another aspect, the base station is configured to establish communications with a terminal and then to transmit to the terminal parameters and/or settings via a dedicated control channel.

Another aspect relates to a base station for a mobile communications cell for communicating in a network with one or more terminals in the cell, wherein a terminal in the cell may have a plurality of antennas that are respectively selectable to transmit signals (to the base station), including a base station transmitter and antenna configured to transmit to terminals in the cell one or more parameters and/or settings representative of characteristics of the base station, cell and/or respective terminals in the cell for use in selecting respective selectable antennas in a terminal for transmitting signals to the base station.

According to another aspect, the base station transmitter is configured to provide signals representing one or more parameters and/or settings for use in an adaptive antenna selection algorithm of a terminal in the cell to select which of a plurality of antennas in the terminal to use in transmitting signals from the terminal to the base station.

According to another aspect, the base station transmitter is configured to provide signals representing one or more parameters and/or settings representative of operative characteristics of signals in uplink communications in the network, operation of the terminal, and/or network conditions, and wherein the operative characteristics, operation of the terminal, and/or network conditions include at least one of:
(i) Maximum swapping rate for antennas;
(ii) Antenna tuning states for main and diversity antenna(s);
(iii) Bands where the antenna selection algorithm should or should not be active;
(iv) Threshold level for when the antenna selection algorithm should be active;
(v) Hysteresis for antenna selection;
(vi) Filtering of RSSI;
(vii) Proximity sensor induced power drop;
(viii) Diversity antenna power reduction (static); and/or
(ix) Force swapping delay time.

These and further aspects and features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

Many aspects of the invention can be better understood with reference to the attached drawings. The components in the drawings are not necessarily to scale, emphasis instead being placed upon clearly illustrating the principles of the present invention. To facilitate illustrating and describing some parts of the invention, corresponding portions of the drawings may be exaggerated in size, e.g., made larger in relation to other parts than in an exemplary device actually made according to the invention. Elements and features depicted in one drawing or embodiment of the invention may be combined with elements and features depicted in one or more additional drawings or embodiments. Moreover, in the drawings, like reference numerals designate like or corresponding parts throughout the several views and may be used to designate like or similar parts in more than one embodiment. Primed reference numerals or reference numerals with a suffix letter, e.g., "a" designate parts that are similar to those designated by the same unprimed or "without a suffix" reference numeral.

BRIEF DESCRIPTION OF THE DRAWINGS

In the annexed drawings.

FIG. 3A is an expanded schematic block diagram of the mobile communications terminal of FIGS. 1 and 2;

FIG. 3B is a schematic block diagram of a base station of FIG. 2;

FIG. 4A is a schematic flow chart or logic diagram, e.g., a computer program type flow chart or functional process/procedure diagram (for brevity referred to below as flow chart), illustrating, primarily from the point of view of a base station, operation according to an embodiment in which a base station broadcasts rules or parameters for adaptive algorithms of terminals;

FIG. 4B is a schematic flow chart illustrating, primarily from the point of view of a base station, operation according to an embodiment in which, when a terminal is connecting with a base station, a dedicated control signal is provided to furnish parameters for the adaptive algorithm of the terminal;

FIG. 5A is a schematic flow chart illustrating, primarily from the point of view of a terminal, a method of communications between a base station broadcasting parameters for adaptive algorithms and one or more terminals that use adaptive algorithms;

DESCRIPTION

Figure 1:
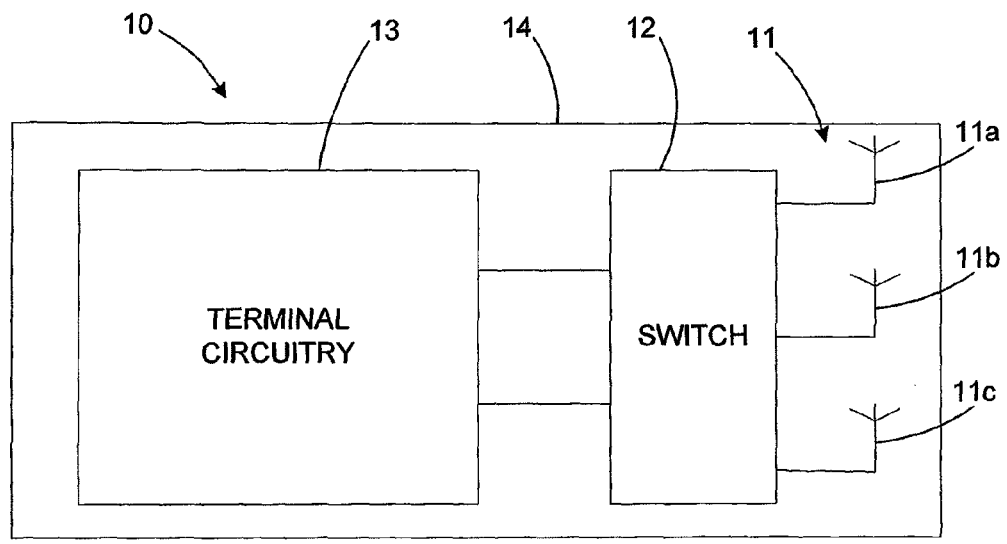
FIG. 1 is a schematic block diagram of an exemplary mobile communications terminal.

The interchangeable terms "electronic equipment" and "electronic device" include portable radio communications equipment. The term "portable radio communications equipment," which hereinafter may be referred to as a "mobile radio terminal," as "portable electronic equipment," or as a "portable communications device," includes all equipment such as, for example, mobile telephones, audio and/or video media players, pagers, communicators, electronic organizers, personal digital assistants (PDAs), smartphones, portable communications apparatus, portable computers, tablet computers, and others that currently exist or may come into existence in the future, or the like.

In the present application, embodiments of the invention are described primarily in the context of a mobile telephone, e.g., sometimes referred to herein as mobile terminal or as terminal, and a network base station that may be functionally operative over a network of a mobile communications system to communicate with each other within a cell. However, it will be appreciated that the invention is not intended to be limited to the context of a mobile telephone and may relate to any type of appropriate electronic equipment, some examples of which are mentioned herein.

The mobile telephone sometimes may be referred to below as mobile terminal, terminal, mobile source, initials "MS", and so on. The network base station sometimes may be referred to as base station, initials "BS", and so on. Uplink communications may also be referred to by initials "UL" and downlink communications may also be referred to by initials "DL."

As is described in further detail herein, the apparatus and method provides for network controlled adaptive antenna selection within terminals of a wireless communications system. The network controls the algorithm used for antenna selection (also referred to herein as swapping) to tend to achieve a consistent behavior among terminals operating in the network and to provide possibility for the base station operator to control cell specific tuning. For example, such base station operator control may be based on the network deployment topology or on some other characteristic(s) and/or requirements.

By standardizing a table or the framework or set of parameters that a base station of a cell could signal to a terminal in the cell, the terminal may choose to select antennas, but has to follow the set of parameters. Thus, borders are established for how the algorithms should work in different terminals in different cells. Therefore, the behavior of respective adaptive antenna switching algorithms in respective terminals is aligned according to the parameters provided by the network base station even when the terminals in a cell are from different manufacturers or different models of a common manufacturer. It is possible to choose to select between antennas, but it is necessary to follow the parameters. Moreover, the network base station provides the parameters to respective terminals in the cell in which the network base station communicates and, thus, by providing the parameters the network base station sets the rules for the uplink communications by the terminals in the cell.

Operators, e.g., base station manufacturers and network operators, can work with manufacturers to set rules for antenna swapping and/or other communications features. And, a table of parameters for use in respective adaptive antenna switching algorithms can be prepared by the cooperative effort of the operators and the terminal manufacturers to obtain consistency and to tend to optimize transmission from terminals to base stations in a cell.

In a small cell, the power may be small, so there is no advantage to use the algorithm and to switch antennas because to run the algorithm uses power that could diminish the uplink transmission power. But, when in a larger cell, there may be higher power and it may be advantageous to turn on the algorithm and to do swapping to optimize for transmission and also power use.

FIG. 1 is a simplified block diagram of a terminal 10 with more antennas 11 (respectively, 11a, 11b, 11c) than transmission chains. A switch 12 before the antennas 11, e.g., electrically upstream of the antennas 11 between the terminal circuitry 13 and the antennas, can select what antenna(s) to utilize at a given time to cooperate with the terminal circuitry to transmit signals. A selection algorithm running within the terminal 10, e.g., in the terminal circuitry 13 in the terminal base band, determines antenna selection, e.g., by controlling operation of the switch 12. The algorithm constantly analyzes conditions in a cell and operative concerns (described below) and provides for dynamically selecting what antenna(s) to use for uplink communications.

The simplest form of the multiple antenna terminal has two antennas and provides for switching back and forth between them according to the running adaptive antenna switching algorithm. Each of the antennas may have different physical and operational characteristics and/or orientation in/on the terminal 10 and/or the terminal circuitry may provide the same signal to the respective antennas or may provide to the antennas respective signals that have different characteristics, which are coordinated with the characteristics of the respective antennas. The illustrated embodiment in FIG. 1 uses three antennas and allows for switching from any one of those antennas to any of the other antennas according to the adaptive antenna switching algorithm, as is described further below. Moreover, the invention is not restricted to number of antennas; there may be more or fewer than three antennas used for uplink communications by the terminal 10.

As is described in further detail below, the selection algorithm running in a terminal is based on network controlled parameters and/or settings to achieve operator/network control and consistent terminal behavior among terminals. For example, the network base station of a cell in which a terminal 10 is located provides to the terminal, over or via the wireless network, parameters and/or settings (collectively referred to as "parameters" below) for the selection algorithm running within the terminal. Different terminals of the same or different manufacturers may run different respective selection algorithms; but the respective selection algorithms behave with at least some or substantial consistency insofar as antenna selection function is concerned according to the parameters received from the network base station of the cell in which a terminal is located. Moreover, base stations and/or networks of different manufacturers may have different operating characteristics of concern when considering antenna selecting in a terminal operating in the cell; but since the base station provides to terminals in the cell parameters for use by the selection algorithms running in the terminals, the respective selection algorithms behave with at least some or substantial consistency insofar as antenna selection function is concerned for the base station of the cell.

In an exemplary terminal 10 of FIG. 1, there may be two or more antennas 11 for uplink transmissions. The antennas may be located inside and/or outside the case 14 of the terminal 10, and the orientation of the antennas and/or the operating characteristics of the antennas may be different. The switch 12 may be an electronic switch, solid state switch, logic circuitry, and so on. The terminal circuitry 13 may be operating circuitry appropriate for the terminal 10. For example, if the terminal 10 is a mobile phone, a PDA, a tablet computer, or some other device that is capable of communications with the base station of a cell, the terminal circuitry 13 may be standard circuitry and computer code (software), instructions or the like associated with such device and also includes an antenna selection algorithm having parameters that can be changed based on those that are received from a base station. The terminal circuitry 13 may include a memory or logic circuitry containing or storing the selection algorithm, e.g., as a series of instructions, computer code, or the like, and a processor and/or other circuitry for operating in response to the selection algorithm to control the switch 12 to select respective antennas to carry out uplink communications with the base station.

Figure 2:
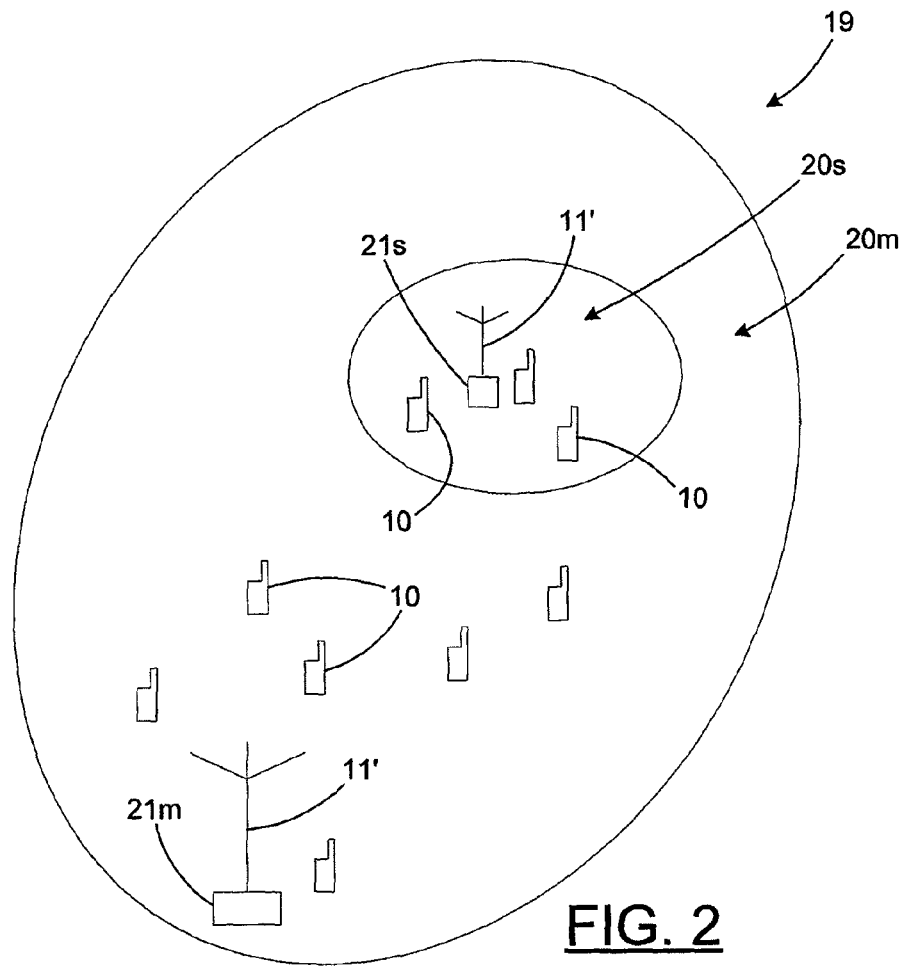
FIG. 2 is a schematic illustration of a mobile communications network including a large cell (also referred to as a macro cell) and a smaller cell, each including a respective base station, and a number of terminals in the cells.

Turning to FIG. 2, a network 19, including two cells 20m, 20s is illustrated. Each cell covers a geographical area in which a respective base station 21m, 21s transmits signals to and receives signals from, e.g., communicates with, respective terminals 10 within the cell. The cell 20m is relatively large in the geographical area covered by the cell as compared to the cell 20s; the cell 20m may be referred to as a macro cell, and the cell 20s may be referred to as a small cell. As an example, the base station 21m may be relatively more powerful than the base station 21s. The geographical area over which the base station 21s may communicate effectively with terminals is that defined by the small cell 20s, and the geographical area over which the base station 21m may communicate effectively with terminals is that defined by the macro cell 20m. It is appreciated that the macro cell 20m includes the geographical area of the small cell 20s; and communications between terminals 10 in the small cell 21s and a respective base station 21m or 21s may be controlled and coordinated by circuitry, software/algorithms, and so on of the respective base stations and of the respective terminals in a manner that customarily is used in the field of wireless network communications.

As is illustrated in FIG. 2, a terminal 10 will, when camping in a cell 20m, 20s, listen to broadcasted cell information, e.g., in order to synchronize with and to detect the cell base station. The two cells 20m, 20s provide an example that cell properties may vary, e.g., power, topography, and so on, and, therefore, the adaptive antenna selection algorithm control may differ from cell to cell. The apparatus and method disclosed herein does not require a certain network topology. Rather, the apparatus and method provide adaptability of terminals with respect to the cells in which located, whereby antenna selection algorithms running in respective terminals in respective cells are adapted to characteristics of the cell, the base station thereof, topology that may affect signal strength and/or antenna function, and so on by adapting the antenna selection algorithms according to parameters that are received from the base station of the cell.

When a connection is established between a base station, e.g., 21m, 21s, and a terminal 10, there are also dedicated control signals used for terminal specific tuning during ongoing voice calls or data transfers.

The method and apparatus hereof may work, for example, in either of two different ways, as follows:

Embodiment 1: The base station 21m, 21s controls the terminal adaptive switching algorithm on the complete cell level based on broadcasted (cell specific) system information blocks, e.g., SIB signaling. For example, the system information blocks are repeatedly transmitted by the base station according to standardized protocols, e.g. described for WCDMA in 3GPP TS 25.331 section "broadcast of system information", and for LTE in TS 36.331 section "system information".

Embodiment 2: The base station 21m, 21s controls the terminal adaptive antenna switching algorithm on the individual terminal level, based on dedicated control channels, e.g., DPCCH in WCDMA (dedicated physical control channel in wideband code division multiple access wireless standard).

Embodiments 1 and 2 are described further below with respect to FIGS. 4A, 4B, 5A and 5B.

Table A below shows a number of example parameters that could be used to define the adaptive antenna switching algorithm functionality. Providing the parameters for a given network, including the base station thereof, gives the network and operator control over the adaptive selection functionality by using consistent parameter settings for use in respective switching algorithms. The parameters shown in Table A could be optimized differently than shown, e.g., they could be optimized based on the particular network and cell conditions or based on some other agreed upon requirements. Table A presents examples to illustrate the operation and function of the apparatus and method disclosed herein.

TABLE A

| "Example of parameters" | Comments |
|---|---|
| (i) Max swapping rate (100 ms-5 s). | Target 1 s, purpose is to avoid user loading which are slow events. |
| (ii) Antenna tuning states for main and diversity antenna. | Antennas might need to be reconfigured in for instance SISO case (single input single output). |
| (iii) Bands where the algorithm shall be active/not active. | If "diversity" antenna in conventional antenna concept does not cover all TX bands (transmission) and modes algorithm can be disabled. |
| (iv) Threshold level for when the algorithm shall be active. | In good signal conditions algorithm might not be beneficial and shall be deactivated. This is different for each band and mode. |
| (v) Hysteresis for antenna selection. (possibly dynamic dependent on RSSI level-received signal strength indicator) | Hysteresis for swapping shall be accessible. Possibly needs to be larger when signal level is low. The hysteresis shall be different for different bands and modes. |
| (vi) Filtering of RSSI. | The filtering of the RSSI (sliding average) needs to be accessible. Different for different bands and modes. |
| (vii) Proximity sensor induced power drop. | When beside head (BH), power might need to be lowered with an offset for one of the antennas. BH can be detected by proximity sensor. The drop is different for different bands and modes. |
| (viii) Diversity antenna power reduction (static). | IF "diversity" antenna supported max power is limited due to SAR (specific absorption rate) the max power for this antenna shall be limited. This parameter is band and mode dependent and can be negative. |
| (ix) Force swapping delay time | If there are no natural slots to perform swapping a delay until the algorithm force a swapping with PA blanking. |

In Table A nine parameters (i) through (ix) are referenced. Each parameter relates to one or more operative concerns. For example, in line (i) the parameter representing an operative concern is the maximum swapping rate, the example being between 100 ms (milliseconds) and 5 s (seconds). This may be minimum switching interval that must expire after switching to a given antenna before permitting switching to another antenna for an uplink transmission. The exemplary target is 1 s (second), the purpose for which is to avoid user loading which typically are slow occurring events, such as moving a hand from one location to another while manually holding the terminal.

An example of a parameter that would be set may be the amount of time to wait before swapping antennas, as was mentioned just above. When a swap occurs, it may be possible that bit errors could occur. Also, a problem could be encountered in that if a swap occurs while there is large data payload being transmitted, that data payload could be cut up and then would need to be re-sent. It would be desirable to minimize occurrence of bit errors. It also would be desirable to assure there is adequate time between one swap and a succeeding swap of antennas in the uplink transmission chain, e.g., to assure there is adequate time for a large data payload to be transmitted without having to be re-transmitted because the original data transmission was cut up.

For convenience, the term "operative event" or the term "operative concern" may be used herein to refer to the parameter of interest, why it may be of interest, and/or what impact should the parameter have on adjustment of the antenna selection algorithm based on the parameter and ultimately on the antenna selection and operation of the terminal with respect to the network base station with which the terminal is communicating. To some extent in the description below the terms parameter, operative event and operative concern may be used somewhat interchangeably to facilitate the description.

Line iv in table A refers to an hysteresis operative event or parameter to avoid that the algorithm swaps back and forth between one or more antennas (even with the delay defined in line i). Thus, an example of a parameter or operative event consideration shown in line (iv) of Table A is a hysteresis consideration pertaining to a threshold level for when the antenna switching algorithm should be active in circumstances that the uplink signal transmission conditions are good. For example, good signal conditions may exist when the uplink transmission signal is relatively strong. In such good signal conditions the performance of the several antennas may be sufficiently similar to carry out uplink transmission. While such case exists, it may not be beneficial to run the antenna switching algorithm and to swap antennas; and the algorithm may be deactivated. Deactivating, e.g., turning off the algorithm, may save power while the good signal condition continues to exist. However, if the difference between the strength of uplink signal transmission of respective antennas meets and/or exceeds the threshold level in line (iv) of Table A, whatever that has been set at, e.g., by the base station, then the algorithm would be made active again so as to determine antenna swapping functions.

Other examples of possible parameters for network control of antenna selection algorithms are hysteresis (line (v) in Table A) and, as mentioned above, minimum switching interval (line (i) in Table A). These parameters could be tuned on a cell basis based on, for example, total system load or other cell specific parameters. For example, one reason to tune the antenna selection algorithm for hysteresis and switch interval is that there may be a tradeoff between the system gains from quick adaptive antenna selection and potential short term transient impact from each antenna switch activity. One example of a short term transient impact may be loss of data from a transmission or being provided for transmission while antenna switching occurs or slow-down of the transmission, for example, as was mentioned above, concerning cut off of part of a large block of data transmission due to antenna switching in the midst of the transmission and the delay encountered due to having to retransmit the data.

Other transients that could trigger "faulty swaps" would be fading or fast movement due to variations in antenna gain pattern. The fading variation might differ over time (e.g., being different in different areas and dependent on the speed of the MS (mobile source or mobile terminal)) and the threshold could then be changed by the BS (base station) to allow faster swaps. If it is mainly small payload traffic (e.g., voice) the swap delay time could be made shorter without risking to cut up large payloads with retransmission as a consequence, hence, slowing down/loading of the network Several examples of network controlled adaptive antenna selection with terminals are described below with respect to a terminal 10 shown in FIG. 3A and the computer flow charts illustrated in FIGS. 4 through 10.

In FIG. 3A a schematic block diagram example of a terminal 10 is as a mobile phone. The terminal may be some other type of wireless device, e.g., as is mentioned above. In and/or on the case 14 of the terminal 10 are the antennas 11a, 11b, 11c (collectively 11), switch 12 and terminal circuitry 13. The terminal circuitry 13 includes a processor 30; memory 31; various other elements or components 32, such as, for example, input/output, such as a touch screen, display, keyboard, accelerometers, power supply and so on, various other components such as, for example, speaker, microphone, camera, and so on; and a radio 33, such as, for example, a transceiver, transmitter, receiver, and so on. From the point of view of the terminal 10 functioning as a mobile phone, the various parts are configured as and to operate in a manner the same or similar to a conventional mobile phone. Additionally the plural antennas 11 and the adaptive antenna functions and antenna switching operation as described herein may be used to enhance the operation of the mobile phone (or other type of terminal).

The terminal circuitry 13 also may include a monitor 34 (shown in a separate box) configured to monitor conditions of the terminal, signal levels, and/or other network conditions, operating characteristics of the terminal, and so on, as described, for example, below. The monitor 34 may be a separate component in the terminal 10 or it may be functions or steps carried out by the processor 30 as conditions, signal levels, and so on are sensed or encountered by the terminal 10.

The antennas 11a, 11b, 11 c may be at different respective locations and relative orientations in and with respect to the case 14. Therefore, in the event the hand of a user holding the terminal 10 were to load, to block or to absorb signal with respect to one antenna, that loading, absorbing or blocking effect may be reduced if the signal were being transmitted by a different antenna; and the adaptive antenna selection function described herein may be used to select a different antenna to enhance uplink signal transmitting. Similarly, if the orientation of the terminal were such that an antenna that currently is transmitting was indicating lower power in the DL (also referred to as down link) compared to an alternative antenna, the adaptive antenna selection function described herein may be used to select the different antenna to continue the transmitting, but with enhanced power effect. The latter would be referred to as "pattern diversity." Hence, even when no antenna is blocked or if the antennas on average have the same performance, the radiation might differ a lot in different directions.

The memory includes instructions to be carried out (executed) using the processor 30, for example, and, thus, the terminal 10 is configured to carry out functions of a mobile phone. Examples of such functions may include, receiving and making telephone calls, sending and receiving messages, internet connection and data receiving and transmitting, photography, playing music, voice recognition, and so on. For example, the processor 30 may execute instructions received from the memory 31 to control the transmitter 335 to provide signals to respective antennas, such that the signals are compatible with the antenna selected at that time. The processor also is configured to operate respective switches, e.g., to open or to close them, to select respective antennas for uplink signal transmission according to the adaptive antenna selection algorithm configured according to the received parameters and/or settings from the base station or operator of the network.

Real and/or virtual keyboards may be included in the components 32 to dial a phone number, to prepare text or data, and so on, as well as other functions of mobile terminals, wireless communications devices and the like, including functions, terminals and devices that currently exist and those that may come into existence in the future.

The memory 31 also includes the adaptive antenna selection algorithm that is carried out by the processor using parameters and/or settings that are received from a base station of a network cell. The parameters and/or settings determine behavior of the algorithm such that antenna selection is carried out in a manner that tends to maintain good uplink transmission characteristics of signals from the terminal to a base station. For example, if a transmission dip, signal absorption by a user's hand, proximity of the terminal to the head of a user, and so on were to occur, a different antenna may be selected by the cooperative interaction of the algorithm, which is configured by the received parameters and/or settings, as the algorithm is executed, i.e., various steps, such as those described below, and respective antennas are switched into and out of use in the transmission of signals from the terminal.

In FIG. 3B a schematic block diagram example of a base station 21', e.g., analogous to base station 21m, 21s, is illustrated. The base station includes one or more antennas 11', processor 30'; memory 31'; radio 33' and various other elements or components generally shown at 32', such as, for example, input/output, such as a touch screen, display, keyboard, power supply, and so on. The radio 33' may be, for example, a transceiver, transmitter, receiver, and so on. From the point of view of the base station 21' functioning in a cell of a network, the various parts are configured as and to operate in a manner the same or similar to a conventional mobile phone, plus the added functions described herein, e.g., relating to providing parameters or settings to terminals for use in the adaptive antenna selection algorithm of the terminals.

It will be appreciated that the terminal circuitry 13 and base station circuitry 13' may include additional or different components configured to carry out the various functions of the terminal for its normal use and also including the adaptive antenna selection functions described herein. Also, it will be appreciated that a person having ordinary skill in the art would be able in a reasonable period of time to write, prepare, or compose the instructions, computer software and the like to carry out the functions described herein, e.g., including the various functions and operations described with respect to the several flow charts illustrated in FIGS. 4-10.

The flow charts and steps thereof as illustrated and described herein represent a method in which the terminal and/or base station may be configured to carry out the described functions and methods hereof.

Referring to FIG. 4A, a flow chart 40 exemplifying Embodiment 1, which is described above, illustrates operation of a base station, such as base station 21m, 21s. At step 41 the base station, e.g., base station 21m, 21s, broadcasts parameters that are expected by the base station to be used by a terminal 10 when the terminal uses an antenna selection algorithm to select respective antennas 11 for transmitting signals to communicate with the base station. Examples of parameters may include those presented above in Table A. At step 42 an inquiry is made whether the base station has connected to a terminal 10. If not, a loop 42a is followed; and if yes, then the communications is established (step 43) with the terminal whereby if the terminal is using an antenna selection algorithm, that algorithm is run using the parameters received from the base station in carrying out the uplink transmission or communications with the base station.

Referring to FIG. 4B, a flow chart 44 exemplifying Embodiment 2, which is described above, illustrates operation of a base station, such as base station 21m, 21s. At step 45 the base station starts or is operating. At step 46 an inquiry is made whether a terminal 10 has been detected in the cell of the base station, e.g., cell 20m, 20s. If not, a loop 46a is followed; and if yes, then at step 47 initial communications is made by the base station with the terminal and then the base station transmits to the terminal the parameters for operation of the terminal's antenna selection algorithm. If the terminal does not have an adaptive antenna feature, this could be determined in the initial communications between the base station and the terminal, and then there would be no need for the base station to transmit the parameters, thus saving power, band width, and so on; and there would be no need to proceed to step 48—communications would be carried out with the terminal without the terminal using an adaptive antenna swapping function. If at step 47 the initial communications leads to transmitting of parameters to the terminal, then at step 43a (similar to step 43 described above) communications is established with the terminal whereby the terminal carries out its uplink transmission or communications function while using the adaptive antenna feature.

Referring to FIG. 5A, a flow chart 50 exemplifying Embodiment 1, which is described above, illustrates operation of a terminal 10, which has an adaptive antenna feature, in a cell, e.g., 20m, 20s, with respect to a base station, e.g., 21m, 21s. At step 51 the terminal 10 enters a cell, e.g., being geographically moved into the cell, being turned on while in the cell, etc. At step 52 the terminal receives parameters broadcasted by the base station associated with the cell, and at step 53 the received parameters are applied to the antenna selection algorithm running in the terminal, e.g., by the processor, software/instruction set stored in the memory, etc., to select respective antennas for uplink communications transmission with the base station. At step 54 uplink communications transmission is carried out applying the algorithm with the received parameters.

Figure 5B:
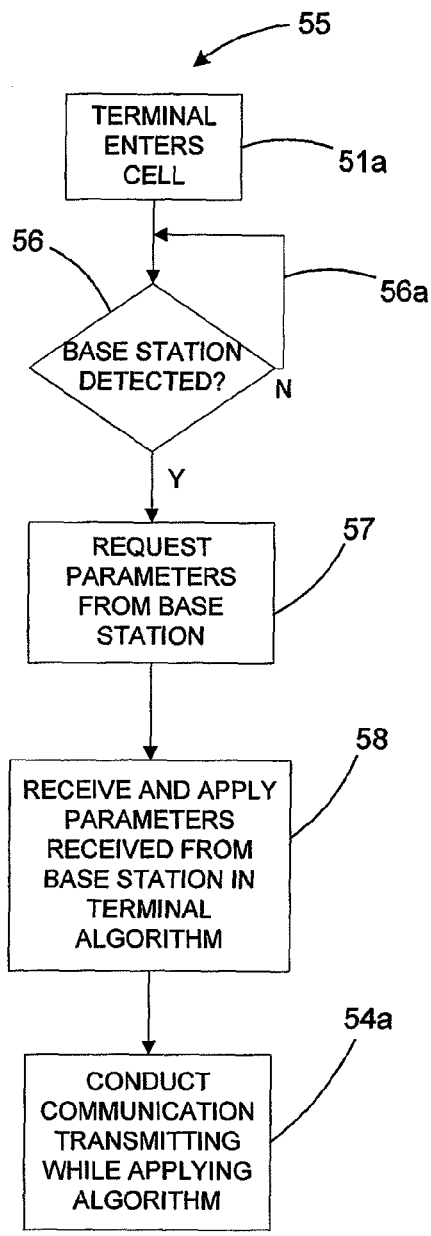
FIG. 5B is a schematic flow chart illustrating, primarily from the point of view of a terminal, a method of communications between a base station and a terminal, wherein communications is established between the base station and terminal and then parameters or settings for the adaptive algorithm are transmitted to the terminal.

Referring to FIG. 5B, a flow chart 55 exemplifying Embodiment 2, which is described above, illustrates operation of a terminal 10, in a cell, e.g., 20m, 20s, with respect to a base station, e.g., 21m, 21s. At step 51a, which is similar to step 51 described above, the terminal 10 enters a cell. At step 56 an inquiry is made whether a base station has been detected. If not, then loop 56a is followed; if yes, then at step 57 initial communications with the base station is established and the terminal requests parameters from the base station. At step 58 the terminal receives from the base station and applies the parameters to the terminal's antenna selection algorithm so that in operation of the terminal to do uplink communications transmission the antenna selection algorithm controls what antenna is used. At step 54a, which is similar to step 54 described above, the terminal conducts uplink communications transmission while applying the antenna selection algorithm.

Several exemplary flow charts are described below to illustrate examples of operative features of the embodiments herein. Table A provides examples of operative concerns that may be considered as an adaptive antenna switching algorithm runs in a terminal that has received parameters from a network base station in communications with the terminal. As the terminal is moved to different cells and communicates with different network base stations, different parameters may be provided by the local base station of a cell to cause the running algorithm to control antenna switching consistent with good communications or optimized communications with the base station of the local cell. Therefore, communications between a terminal and base station will tend to be consistent as the terminal is moved from cell to cell. Also, since the parameters will be used by different terminals, e.g., of different or even of the same manufacturers, having different switching algorithms, by providing parameters to the respective terminals and switching algorithms thereof will tend to provide for such consistency of uplink communications in respective cells for the different terminals.

Figure 6:
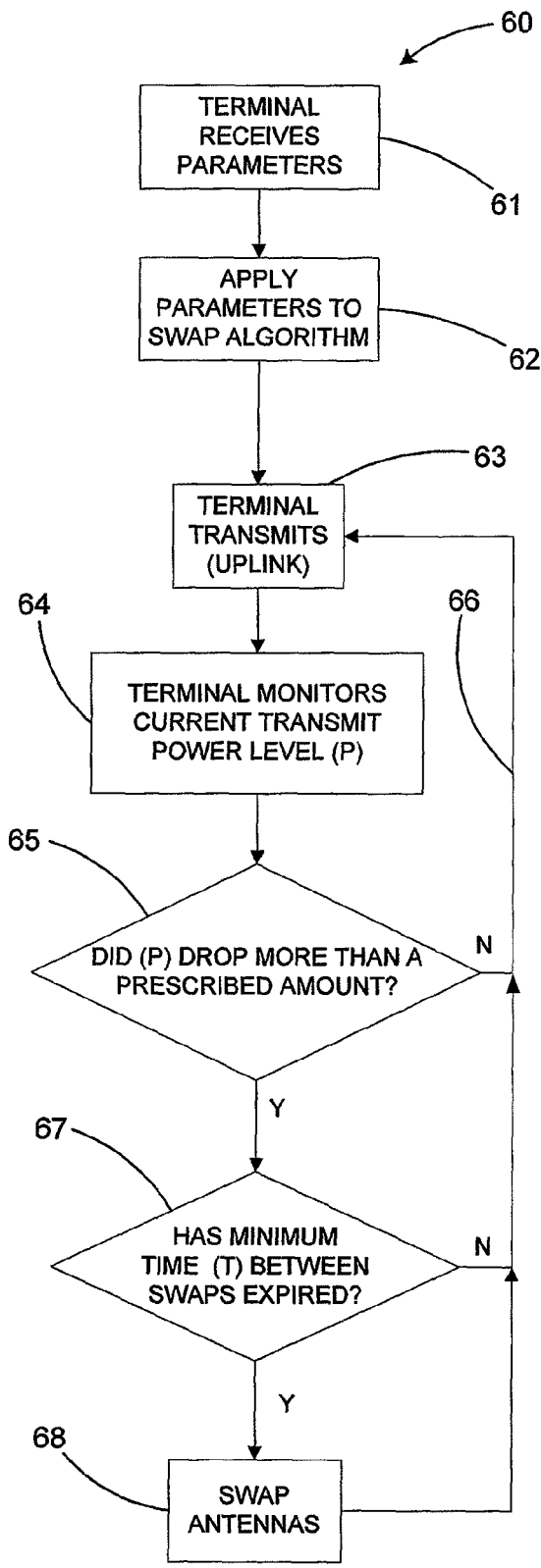
FIG. 6 is a schematic flow chart illustrating an embodiment in which power drop is an operative concern based on which antenna swapping may occur.

Turning to FIG. 6, a flow chart 60 illustrates an example of operation of a terminal 10 that is monitoring uplink communications transmission power as the operative concern. At step 61 the terminal 10 receives the swapping parameters, i.e., the parameters for application in the antenna selection algorithm. At step 62 the parameters are applied. At step 63 the terminal carries out uplink communications transmission to a base station. At step 64 the terminal monitors the current uplink communications transmission power level (P). As for the power level (P) with reference to line (iv) in Table A, if the power level (P) is above a threshold level representing good signal conditions, the antenna selection algorithm or at least part of its function might not be beneficial and may be temporarily deactivated. Deactivating the antenna selection algorithm and possibly also circuitry associated with carrying out an antenna swapping or switching may save power, for example. At step 65 an inquiry is made whether power (P) has dropped more than a prescribed amount. If no, then loop 66 is followed back to step 63. If yes, then at step 67 an inquiry is made whether minimum time (T) between swaps has expired (line (i) in Table A), i.e., how much time has expired since the last antenna swapping occurred and does that time equal or exceed the minimum time (T). If no, then loop 66 is followed; but if yes, then at step 68 antenna swapping occurs and then loop 66 is followed. As is evident from Table A, line (iv), the threshold level power (P) may be different for different bands and modes.

Antenna swapping and antenna switching (the terms swapping and switch) are used to mean the same thing: Namely, one antenna is deactivated from its communications function and another antenna is activated to carry out communications function, e.g., according to the switching action of the switch 12 (FIGS. 1 and 3).

Figures 7, 8:
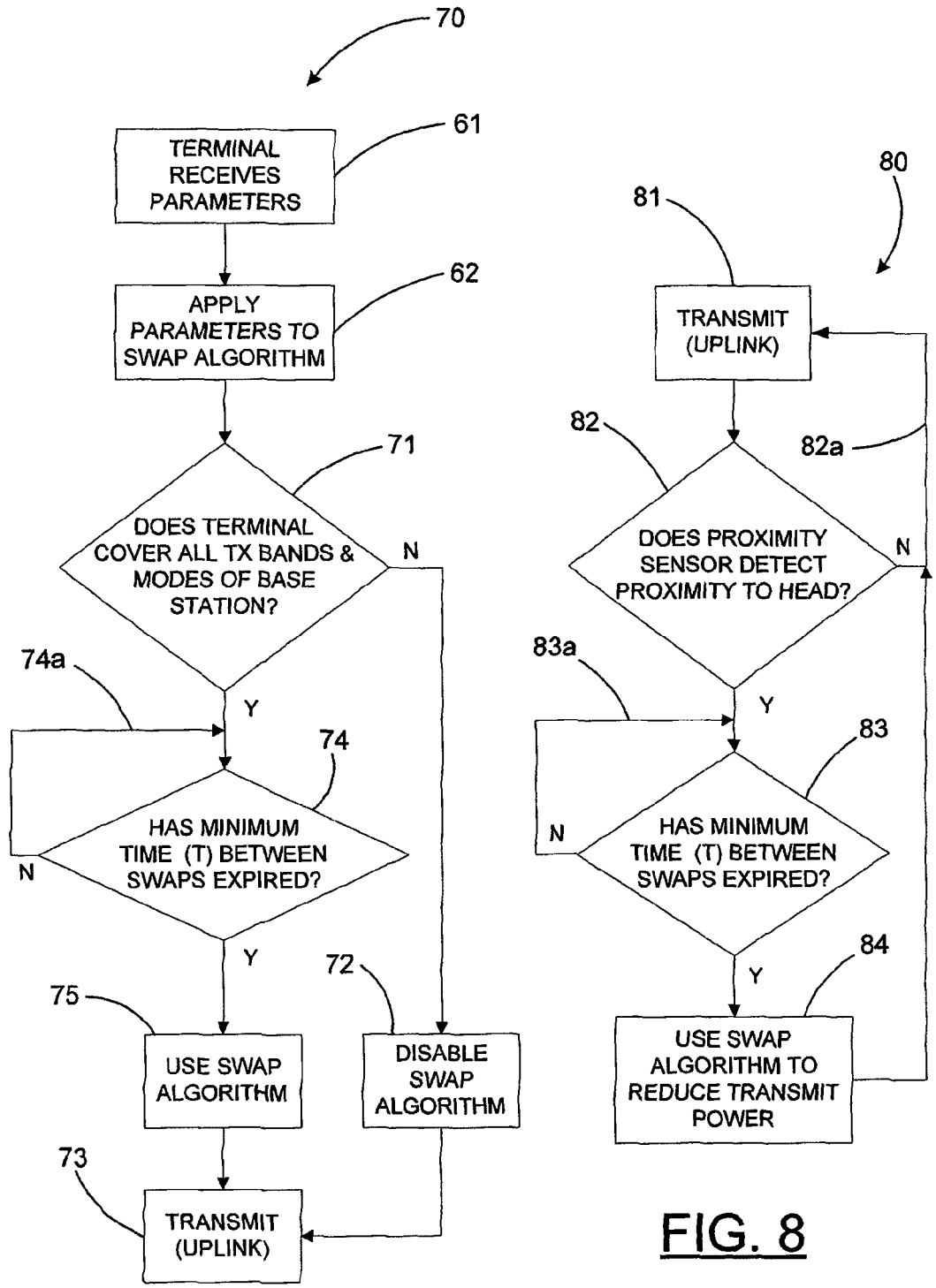
FIG. 7 is a schematic flow chart illustrating an embodiment in which coverage of all transmission bands and modes of the base station is an operative concern based on which antenna swapping may occur.
FIG. 8 is a schematic flow chart illustrating an embodiment in which proximity to the head of a user is an operative concern based on which antenna swapping may occur.

In FIG. 7 is a flow chart 70 applying line (iii) of Table A in which the operative concern is bands covered and whether the switching algorithm is to be active or not. At steps 61 and 62 the terminal 10 receives the parameters and applies the parameters to the swapping algorithm (antenna selection algorithm), as is described above. At step 71 an inquiry is made whether the terminal covers all transmission (TX) bands and modes of the base station to which it is coupled for transmission in the given cell. If not, then at step 72 the antenna swapping function is disabled by disabling operating of the swapping algorithm, at least for a time, and then at step 73 uplink communications transmission is carried out. At step 71 if the answer is yes, then at step 74 an inquiry is made whether minimum time expired (T between swaps has expired (line (i) of Table A, as described above, for example, with respect to step 67 in FIG. 6). If no, then loop 74a is followed. If yes, then at step 75 the swapping algorithm is used and appropriate antenna swapping according to the swapping algorithm may be carried out, after which uplink communications transmission occurs at step 73.

As will be appreciated, the flow chart 70 may be a subroutine for carrying out antenna selection (swapping) according to other operative concerns of Table A and parameters pertaining to those operative concerns. For example, lines (iv) through (viii) in Table A relate to a dependency on some characteristic of transmission band(s) and mode(s). Therefore, in carrying out steps associated with the parameters and operating of the antenna selection algorithm represented in those lines of Table A, steps similar to the steps of flow chart 70 may be carried out. So, for example, if the transmission bands and modes criteria are not met, it may be that carrying out antenna swapping functions according to other parameters in Table A or still other parameters that are not shown in Table A may be prevented or in some way restricted so as to tend to avoid degrading the uplink communications transmission function by antenna swapping.

Furthermore, it will be appreciated that the exemplary flow charts illustrated and described herein may be carried out simultaneously, sequentially or in some combination thereof to obtain the desired carrying out of the antenna selection algorithm under control of the network base station.

FIG. 8 illustrates a flow chart 80 and method for using an antenna swapping algorithm to reduce communications transmission power of a terminal 10 when that terminal is in close proximity to the head of a user, e.g., as the user is holding the terminal near his or her face to listen to and to speak into the terminal while carrying out a telephone conversation. This corresponds to line (vii) in Table A. At step 81 uplink communications transmission is carried out. At step 82 an inquiry is made whether a proximity sensor detects proximity of the terminal to the head of a user. If not proximate to the head to a prescribed extent, e.g., touching or otherwise sensing proximity within some prescribed amount, then loop 82a is followed. If yes, the terminal is proximate to the head of the user, then at step 83 an inquiry is made whether minimum time (T) between swaps has expired, as was discussed above with respect to line (i) of Table A and steps 67 and 74 in FIGS. 6 and 7, respectively. If no, then loop 83a is followed. If yes, then at step 84 the swapping algorithm is used to reduce the uplink communications transmission power and switch to using a different antenna for the uplink communications and loop 82a is followed; uplink communications transmission continues at step 81, but at the reduced power using the swapped antenna.

Figure 9:
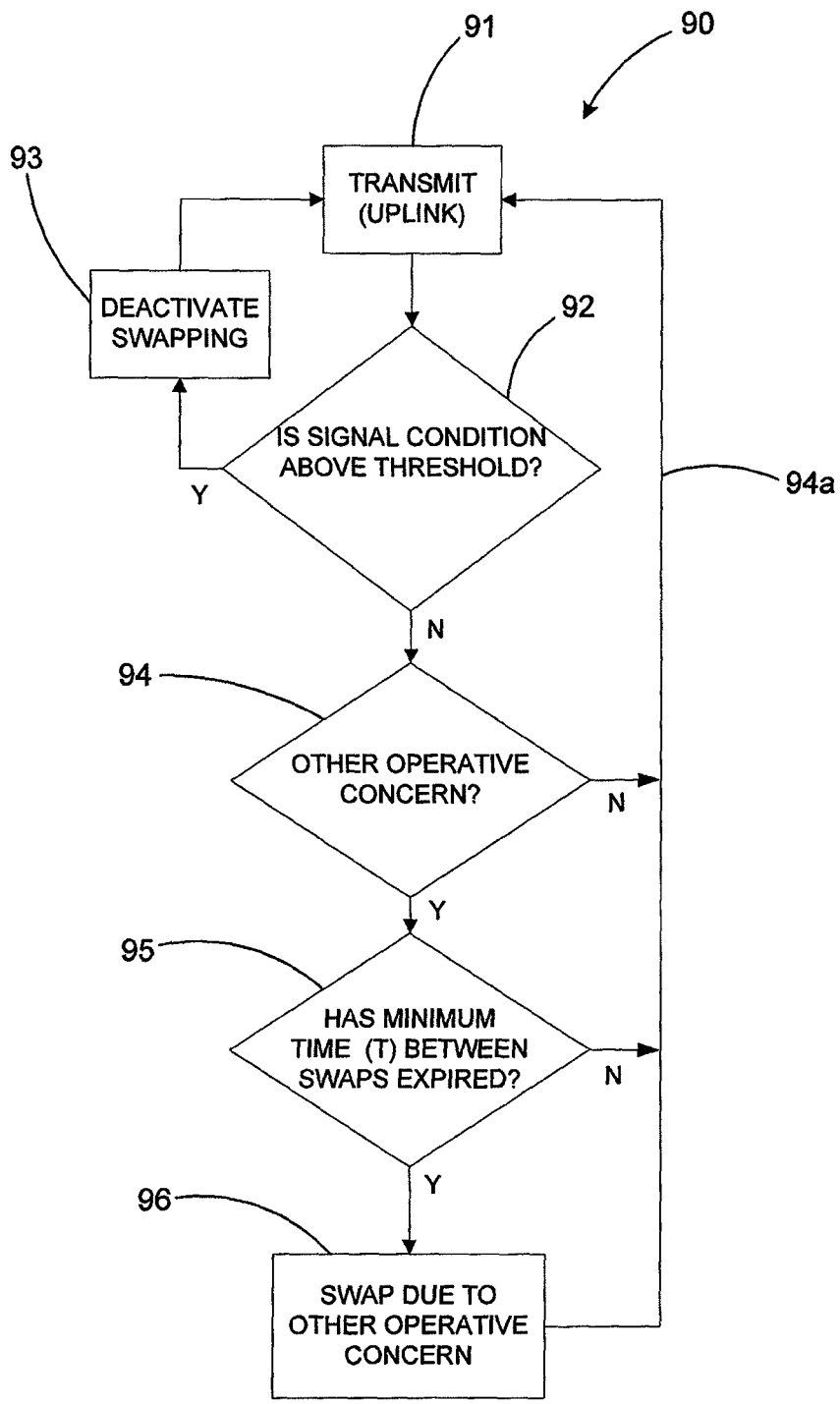
FIG. 9 is a schematic flow chart illustrating an embodiment in which signal condition is an operative concern based on which antenna swapping may occur.

FIG. 9 is a somewhat generic flow chart 90 illustrating operation of a terminal 10. Reference is made initially to line (iv) of Table A in which operative concern is threshold power and, generically, possibly other operative concerns. Uplink communications transmission is carried out at step 91. At step 92 an inquiry is made whether the uplink communications transmission signal is above a threshold level that indicates "good signal conditions" represented by a parameter received from the network base station. If yes, then antenna swapping may be deactivated or disabled at step 93. As is mentioned above, deactivating the swapping function may save power and may avoid data loss that may occur during a swapping operation.

If at step 92 the signal is not above a threshold, then at step 94 inquiry(ies) as to one or more other operative concerns may be made and appropriate actions taken. The other operative concerns may be as shown in Table A and/or may be one or more other operative concerns that are not shown in Table A. If there are no other operative concerns that would affect antenna swapping, power reduction, and so on, then loop 94a is followed back to step 91. If there is an operative concern that would cause the terminal to take an antenna swapping action, then an inquiry is made at step 95 as to whether minimum time (T) between swaps has expired, as was described above with respect to steps 67, 74 and 83; if not, then look 94a is followed. If yes, then at step 96 antenna swapping is carried out due to the other operative concern; and the flow chart returns to step 91 to continue uplink communications transmission.

Figure 10:
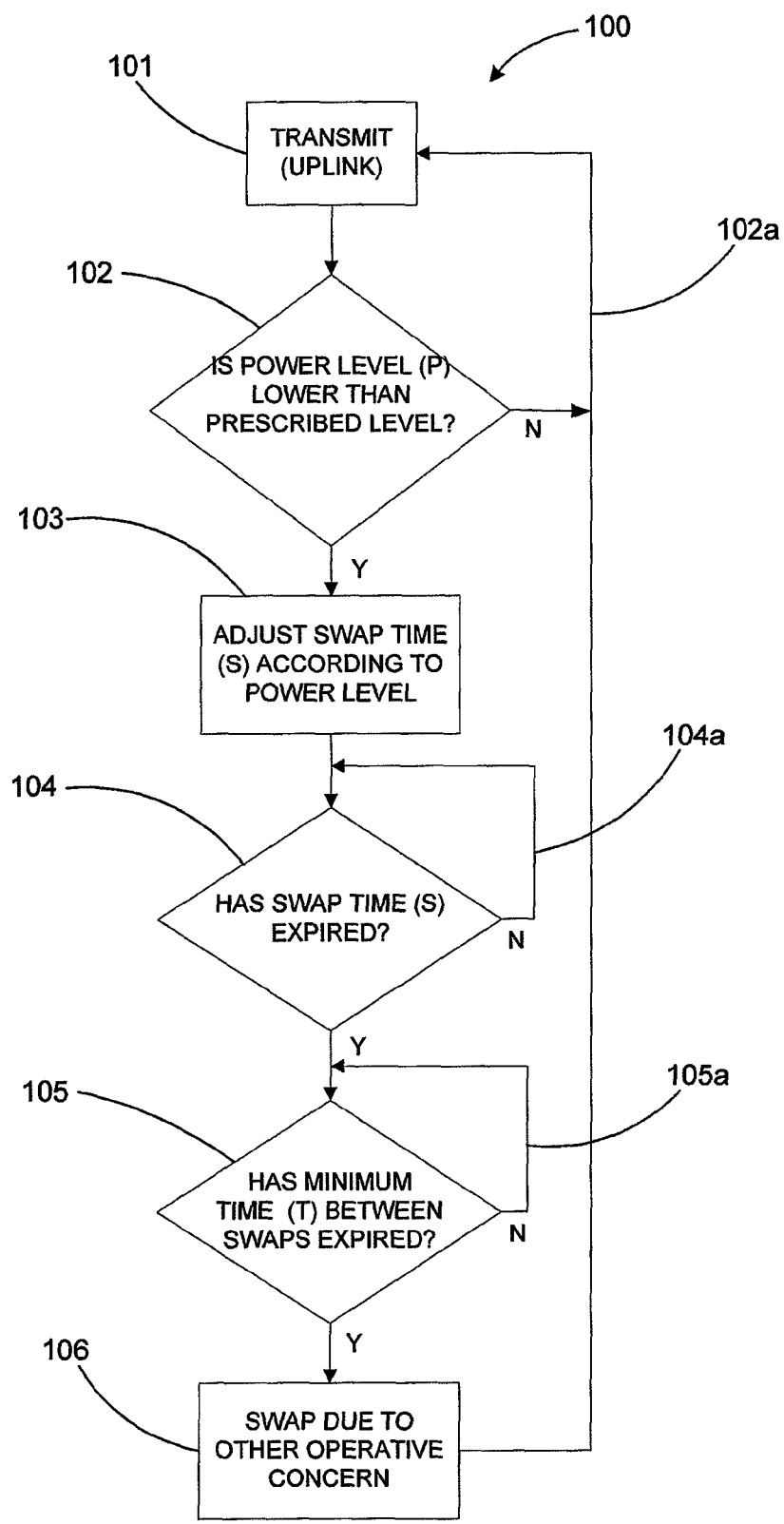
FIG. 10 is a schematic flow chart illustrating an embodiment in which power level is an operative concern based on which antenna swapping may occur.

Reference is made to FIG. 10 and flow chart 100 in which hysteresis is accommodated in a manner to avoid ping pong (too rapidly switching antennas back and forth (on and off), e.g., from one to another and back again). In several of the flow charts mentioned above and in Table A several exemplary operative concerns are described. Those operative concerns and whether or not antenna swapping may occur may be based at least in part on the power level of the uplink communications transmission power. As is indicated at line (v) of Table A, carrying out of antenna selection function or antenna swapping may be different for different uplink communications transmission power levels. For example, referring to line (v) of Table A, if the signal level is low, it may be desirable to increase the delay between antenna swaps. This may be an anti-hysteresis function, e.g., to avoid a ping pong effect of too rapidly switching between antennas.

In flow chart 100 of FIG. 10, at step 101 uplink communications transmission is carried out by the terminal 10. At step 102 an inquiry is made whether the power level (P) of the uplink communications transmission signal is lower than a prescribed level. If no, then loop 102a is followed; and one or more others of the flow charts and procedures associated with antenna swapping may be carried out, e.g., such as the examples described above. However, if yes, then at step 103 the swapping time (S) is adjusted according to power level of the uplink communications transmission. The extent of that adjustment may be determined by one or more parameters received from the network or may otherwise be determined, e.g., in a step-wise increased time amount. The time between swaps may need to be longer when the uplink signal level is relatively low as compared to shorter when the signal level is relatively high.

One example of a parameter that could be used as a base for the antenna selection algorithm may be the cell output power, since it may indicate the cell size. This parameter could impact how the antenna selection algorithm could work, since with a smaller cell there is a higher likelihood for handover situations, etc. where adaptive antenna selection may be different or possibly avoided. For example, if the terminal is located/connected to a small cell (i.e. a cell with geographically limited coverage), it is more likely that the terminal will be at or near the cell edge as compared to if a terminal is located in a larger cell. Hence, it is more likely that the terminal will need to enter a handover scenario from one cell to another. In such case it is not suitable to conduct frequent antenna swapping activity, since swapping antennas when a handover operation would occur would make such handover operation more difficult. One possible way to get an indication of the cell size would be to analyze output power and then coordinate the antenna swapping algorithm and antenna swapping function accordingly to avoid problems when handover may be expected to occur.

Another reason to use mobile device output power as a parameter for the antenna selection algorithm is that the power consumption gain that can be obtained by using antenna swapping, i.e., reduce the power consumption of the terminal while still transmitting a suitable uplink signal, is less when the output power is already low, since typically the terminal power consumption is exponentially increasing with increased output power. Hence when power is low one could limit the swapping by increasing the minimum time between swaps.

At step 104 an inquiry is made whether the swapping time (S) has expired, i.e., has sufficient time passed to permit swapping antennas? If not, then loop 104a is followed; if yes, then at step 105 an inquiry is made whether minimum time (T) between swaps has expired (as in steps 67, 74, 83 and 95 described above). If not, then loop 105a is followed; if yes, then at step 106 swapping is permitted due to another operative concern, e.g., one of the operative concerns described above or another operative concern for which the antenna selection algorithm is intended to take antenna swapping action. Thereafter, loop 102a may be followed.

Operation of the mobile phone (terminal) 10 and base station, e.g., 21m, 21s, of a cell, e.g., 20m, 20s, may be under computer program control or the like, AS DESCRIBED ABOVE. Such operation may be as is performed to carry out the functions of a mobile phone, and the various steps, operations and procedures described above may be carried out under computer program control or the like.

It will be appreciated that portions of the present invention can be implemented in hardware, software, firmware, or a combination thereof. In the described embodiment(s), a number of the steps or methods may be implemented in software or firmware that is stored in a memory and that is executed by a suitable instruction execution system. If implemented in hardware, for example, as in an alternative embodiment, implementation may be with any or a combination of the following technologies, which are all well known in the art: discrete logic circuit(s) having logic gates for implementing logic functions upon data signals, application specific integrated circuit(s) (ASIC) having appropriate combinational logic gates, programmable gate array(s) (PGA), field programmable gate array(s) (FPGA), etc.

Any process or method descriptions or blocks in flow charts may be understood as representing modules, segments, steps or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

The logic and/or steps represented in the flow diagrams of the drawings, which, for example, may be considered an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The above description and accompanying drawings depict the various features of the invention. It will be appreciated that the appropriate computer code could be prepared by a person who has ordinary skill in the art to carry out the various steps and procedures described above and illustrated in the drawings. It also will be appreciated that the various terminals, computers, servers, networks and the like described above may be virtually any type and that the computer code may be prepared to carry out the invention using such apparatus in accordance with the disclosure hereof Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

We claim:

1. A mobile communications terminal, comprising
a transmitter configured to provide signals for uplink transmission in a network,
a plurality of antennas configured to cooperate with the transmitter to transmit signals for communications with a base station in the network,
a non-transitory memory configured to store antenna selection instructions for use in selecting which of the antennas to cooperate with the transmitter to transmit signals,
a processor configured to execute antenna selection instructions from the memory to determine selecting of respective antennas,
a receiver configured to receive from a base station signals representing one or more parameters and/or settings for use in antenna selection instructions executed by the processor in determining selecting of respective antennas for transmission, wherein the parameters and/or settings include a maximum swapping rate for antennas, and
a monitor configured to monitor operative characteristics of the terminal, wherein:
the non-transitory memory is configured to store antenna selection instructions that include an adaptive antenna selection algorithm, and
the processor is configured to:
compare the monitored operative characteristics to a given condition,
when the monitored operative characteristics satisfy the given condition, determine whether a minimum time corresponding to the max swapping rate has passed since a previous antenna swap, and
when the minimum time has passed, execute antenna selection instructions to select respective antennas by the adaptive antenna selection algorithm based on the monitored operative characteristics and the received one or more parameters or settings.

2. The mobile communications terminal of claim 1, wherein the monitor is configured to monitor operative characteristics of signals in uplink communications in the network, operation of the terminal, and/or network conditions, and wherein the processor is configured to execute the antenna selection algorithm in relation to the monitored operative characteristics.

3. The mobile communications terminal of claim 2, wherein the operative characteristics, operation of the terminal, and/or network conditions comprise at least one of:
(i) Antenna tuning states for main and diversity antenna(s);
(ii) Bands where the antenna selection algorithm should or should not be active;
(iii) Threshold level for when the antenna selection algorithm should be active;
(iv) Hysteresis for antenna selection;
(v) Filtering of RSSI;
(vi) Proximity sensor induced power drop;
(vii) Diversity antenna power reduction (static); and/or
(viii) Force swapping delay time.

4. The mobile communications terminal of claim 1, wherein the processor is configured to control the transmitter as to provide signals compatible with the currently selected antenna, and wherein the transmitter is configured to cooperate with the processor terminal transmit uplink signals in a number of transmission chains, and the number of said antennas is larger than the number of transmission chains.

5. The mobile communications terminal of claim 1, further comprising a case, and wherein a number of the antennas are at different locations and/or orientations relative to the case, and further comprising switches configured to couple signals from the transmitter to respective antennas, and wherein the processor is configured to control the switches to couple respective antennas to receive signals for communications with a base station in the network.

6. The mobile communications terminal of claim 1, wherein the transmitter, antennas and processor are configured for uplink communications in a plurality of respective bands and modes, and wherein the processor is configured to select respective antennas based at least in part on the band and/or mode of uplink communications.

7. The mobile communications terminal of claim 1, wherein the receiver is configured to receive signals from a base station representing one or more parameters and/or settings in response to entering a network cell.

8. The mobile communications terminal of claim 1, wherein the receiver is configured to receive signals from a base station in response to making a connection with the base station and then via a dedicated control channel.

9. The mobile communications terminal of claim 1, wherein:
the monitored operative characteristics of the terminal include transmission bands and modes of the terminal,
transmission bands and modes of the base station are received as one of the one or more parameters and/or settings, and
the comparing of the monitored operative characteristics to the given condition includes determining if the transmission bands and modes of the terminal cover all of the transmission bands and modes of the base station.

10. The mobile communications terminal of claim 1, wherein:
the terminal includes a proximity sensor,
the monitored operative characteristics of the terminal include a detection by the proximity sensor of a head of a user of the terminal, and
the comparing of the monitored operative characteristics to the given condition includes determining if the head of the user is detected as proximal to the terminal.

11. The mobile communications terminal of claim 1, wherein:
the monitored operative characteristics of the terminal include a signal condition, and
the comparing of the monitored operative characteristics to the given condition includes determining if the signal condition is above a threshold received as one of the one or more parameters and/or settings.

12. A mobile communications system, comprising at least one terminal as set forth in claim 1, and
a base station for a mobile communications cell for communicating with one or more of said terminal(s) in the cell, including a base station transmitter configured to transmit to terminals in the cell one or more parameters and/or settings representative of characteristics of the base station, cell and/or respective terminals in the cell for use in selecting respective antennas in a terminal for transmitting signals to the base station.

13. A method of selecting respective antennas in a mobile communications terminal that has a plurality of antennas to transmit signals, a processor, and a transmitter for providing signals for transmitting via respective antennas, comprising
receiving from a remote source in a network signals representing one or more parameters and/or settings for use in determining respective antennas to transmit signals wherein the parameters and/or settings include a maximum swapping rate for antennas,
monitoring operative characteristics of the terminal, wherein said monitoring comprises monitoring operative characteristics of signals in uplink communications in the network, operation of the terminal, and/or network conditions,
compare the monitored operative characteristics to a given condition,
when the monitored operative characteristics satisfy the given condition, determining whether a minimum time corresponding to the max swapping rate has passed since a previous antenna swap,
when the minimum time has passed, processing with the processor antenna selection instructions including an adaptive antenna selection algorithm to determine respective antennas to transmit signals based on the monitored operative characteristics and one or more of the parameters and/or settings,
using the results of the processing, selecting a respective antenna, and
controlling the transmitter as to provide signals compatible with the currently selected antenna.

14. The method of claim 13, wherein the operative characteristics, operation of the terminal, and/or network conditions comprise at least one of:
(i) Antenna tuning states for main and diversity antenna(s);
(ii) Bands where the antenna selection algorithm should or should not be active;
(iii) Threshold level for when the antenna selection algorithm should be active;
(iv) Hysteresis for antenna selection;
(v) Filtering of RSSI;
(vi) Proximity sensor induced power drop;
(vii) Diversity antenna power reduction (static); and/or
(viii) Force swapping delay time.

15. The method of claim 13, wherein the terminal is configured to receive parameters and/or settings as broadcast from a network cell base station upon entering the network cell.

16. The method of claim 13, wherein the terminal is configured to establish communications with a base station and to receive parameters and/or settings via a dedicated control channel.

17. A communications method, comprising
sending from a base station one or more parameters and/or settings for use by a terminal in a process to select which of a plurality of antennas in the terminal to use in transmitting signals from the terminal, wherein:
said sending comprises sending one or more parameters and/or settings for use in an adaptive antenna selection algorithm in a terminal to use in transmitting signals from the terminal to the base station,
the parameters and/or settings include a maximum swapping rate for antennas,
the parameters and/or settings are representative of operative characteristics of signals in uplink communications in the network, operation of the terminal, and/or network conditions, and
the operative characteristics, operation of the terminal, and/or network conditions comprise at least one of:
(i) Antenna tuning states for main and diversity antenna(s);
(ii) Bands where the antenna selection algorithm should or should not be active;
(iii) Threshold level for when the antenna selection algorithm should be active;
(iv) Hysteresis for antenna selection;
(v) Filtering of RSSI;
(vi) Proximity sensor induced power drop;
(vii) Diversity antenna power reduction (static); and/or
(viii) Force swapping delay time.

18. A base station for a mobile communications cell for communicating in a network with one or more terminals in the cell,
wherein a terminal in the cell may have a plurality of antennas that are respectively selectable to transmit signals (to the base station), comprising
a base station transmitter and antenna configured to transmit to terminals in the cell one or more parameters and/or settings representative of characteristics of the base station, cell and/or respective terminals in the cell for use in selecting respective selectable antennas in a terminal for transmitting signals to the base station, wherein the parameters and/or settings include a maximum swapping rate for antennas.

19. The mobile communications terminal of claim 1, wherein:
the monitored operative characteristics of the terminal include a current transmit power level of the terminal,
the comparing of the monitored operative characteristics to the given condition includes determining if the current transmit power level drops by more than a prescribed amount, and
the prescribed amount is received as one of the one or more parameters and/or settings.

20. The mobile communications terminal of claim 19, wherein the maximum swapping rate is adjusted according to the current transmit power level.

* * * * *